United States Patent
Huang-Fu et al.

(10) Patent No.: US 9,609,507 B2
(45) Date of Patent: Mar. 28, 2017

(54) METHOD OF DEVICE-ASSISTED ENHANCED SIM REPLACEMENT

(71) Applicant: MEDIATEK INC., Hsinchu (TW)

(72) Inventors: Chien-Chun Huang-Fu, Hsinchu (TW); I-Kang Fu, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/669,205

(22) Filed: Mar. 26, 2015

(65) Prior Publication Data

US 2015/0282060 A1    Oct. 1, 2015

Related U.S. Application Data

(60) Provisional application No. 61/971,910, filed on Mar. 28, 2014.

(51) Int. Cl.
*H04W 4/00*   (2009.01)
*H04M 3/00*   (2006.01)
*H04M 1/00*   (2006.01)
*H04W 8/20*   (2009.01)

(52) U.S. Cl.
CPC ................... *H04W 8/205* (2013.01)

(58) Field of Classification Search
None
See application file for complete search history.

(56) References Cited

U.S. PATENT DOCUMENTS

| 2006/0234693 A1 | 10/2006 | Isidore et al. ............. 455/422.1 |
| 2012/0225651 A1* | 9/2012 | Rysgaard ............ H04W 60/005 455/435.1 |
| 2014/0024361 A1* | 1/2014 | Poon ..................... H04W 12/06 455/419 |
| 2014/0044099 A1 | 2/2014 | Sfar .............................. 370/331 |

(Continued)

FOREIGN PATENT DOCUMENTS

| CN | 103460756 A | 4/2011 |
| CN | 102244941 A | 7/2011 |

OTHER PUBLICATIONS

International Search Report and Written Opinion of International Search Authority for PCT/CN2015/075240 dated Jun. 23, 2015(12 pages).

*Primary Examiner* — Erika Washington
(74) *Attorney, Agent, or Firm* — Imperium Patent Works; Zheng Jin; Helen Mao

(57) ABSTRACT

A method of supporting enhanced SIM replacement procedure is proposed. A UE detects that a first identification module running a first application is inserted. The first identification module belongs to a PLMN, and an enhanced service is provided by an operator of the PLMN via a second application. The UE sends a notification to the operator for obtaining a second identification module. The UE detects that the second identification module running the second application is inserted. The UE sends a second notification to the operator for activating the second identification module such that the UE is able to use the enhanced service (Continued)

provided by the operator. The device-assisted solution for SIM replacement complies with existing security/authentication model, has no standard charge, and complies with existing SIM replacement model and offers a simpler and more automatic procedure.

20 Claims, 5 Drawing Sheets

(56) References Cited

U.S. PATENT DOCUMENTS

| | | | |
|---|---|---|---|
| 2015/0126187 A1* | 5/2015 | Ponukumati | H04W 72/02 455/434 |
| 2015/0245309 A1* | 8/2015 | Nayak | H04W 60/005 455/435.3 |

* cited by examiner

METHOD OF DEVICE-ASSISTED ENHANCED SIM REPLACEMENT

CROSS REFERENCE TO RELATED APPLICATIONS

This application claims the benefit under 35 U.S.C. §119 from U.S. provisional application Ser. No. 61/971,910, entitled "Method of Device-Assisted SIM Replacement," filed on Mar. 28, 2014, the subject matter of which is incorporated herein by reference.

TECHNICAL FIELD

The disclosed embodiments relate generally to mobile communication networks, and, more particularly, to enhanced SIM replacement.

BACKGROUND

A Subscriber Identity Module or Subscriber Identification Module (SIM) card is a portable memory chip used mostly in cellular phones that operate on the Global System for Mobile Communications Network. A SIM card contains its unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking. 3GPP is now responsible for the further development of applications like SIM and USIM—the UMTS Subscriber Identity Module. The USIM brought security improvements like the mutual authentication and longer encryption keys and an improved address book. While 3G/LTE subscribers are allowed to access the 2G network, 2G subscribers cannot access the LTE network unless they replace SIM with USIM. In China, most of the China Mobile (CMCC) subscribers still hold 2G SIM card. While CMCC allow 3G/LTE subscribers use 2G SIM, USIM is a mandatory requirement for LTE UE. However, replacing all 2G SIM by USIM will take a long time.

The SIM replacement procedure today is inconvenient. A customer will likely to find the LTE mode on a newly bought 4G phone is unusable due to the 2G SIM. This may happen if the customer buys the LTE phone from other countries or from the open market, and many of the CMCC 3G users still use 2G SIM. The customer will then go to an operator store for SIM replacement, but access to the operator store may not always be convenient. The operator will then replace the SIM for the customer, including provide a new USIM card, activate the new USIM card and renew the contract, and associated the legacy phone number with the new USIM card. Due to the inconvenient SIM replacement procedure, the open market space for LTE smartphones becomes restricted. As a result, most users may directly buy LTE smartphones from the operators, and other medium or small smartphone vendors will have difficulty to survive due to the barrier to enter the operator purchase channel.

Therefore, the SIM to USIM replacement problem may become the bottleneck of LTE device market space. It degrades user's motivation to buy new LTE phone. The operator channel becomes more dominant. The problem will become more serious because LTE deployment gradually enters developing countries, which still have large amount of 2G users. A device-assisted solution for remote SIM replacement is sought.

SUMMARY

A method of supporting an enhanced SIM replacement procedure is proposed. A UE detects that a first identification module running a first application is inserted. The first identification module belongs to a PLMN, and an enhanced service is provided by an operator of the PLMN via a second application. The UE sends a notification to the operator for obtaining a second identification module. The UE detects that the second identification module running the second application is inserted. The UE sends a second notification to the operator for activating the second identification module such that the UE is able to use the enhanced service provided by the operator.

In one embodiment, the first identification module is a 2G SIM module running SIM application and the second identification module is a USIM module running USIM application. The 2G SIM card and the USIM card belong to the same PLMN provided by the same operator. However, the 2G SIM card cannot be used to attach to the 3G/LTE network. Once an LTE device detects such problem, the LTE device will assist the 2G subscriber to notify the operator. Upon receiving the first notification, the operator will send a new USIM card to the user. Later on, the new USIM card is activated and the old 2G SIM card is replaced under UE assistance. Finally, the user is able to attach to LTE networks and make LTE voice calls.

In one embodiment, the LTE UE is a dual-SIM device having two SIM slots. A first SIM slot is inserted with the 2G SIM card, and a second SIM slot is inserted with the received new USIM card. The new USIM card is inactivated initially. Upon detecting the inactivated USIM card in the second SIM slot, the UE will send the second notification to the operator via the data path registered by the 2G SIM card in the first SIM slot. In one example, the second notification comprises at least one of an International Mobile Subscriber Identity (IMSI) of the first identification module (the 2G SIM card), an IMSI of the second identification module (the USIM card), an International Mobile Station Equipment Identity (IMEI) of the UE with the 2G SIM card inserted, and an IMEI of the UE with the USIM card inserted.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
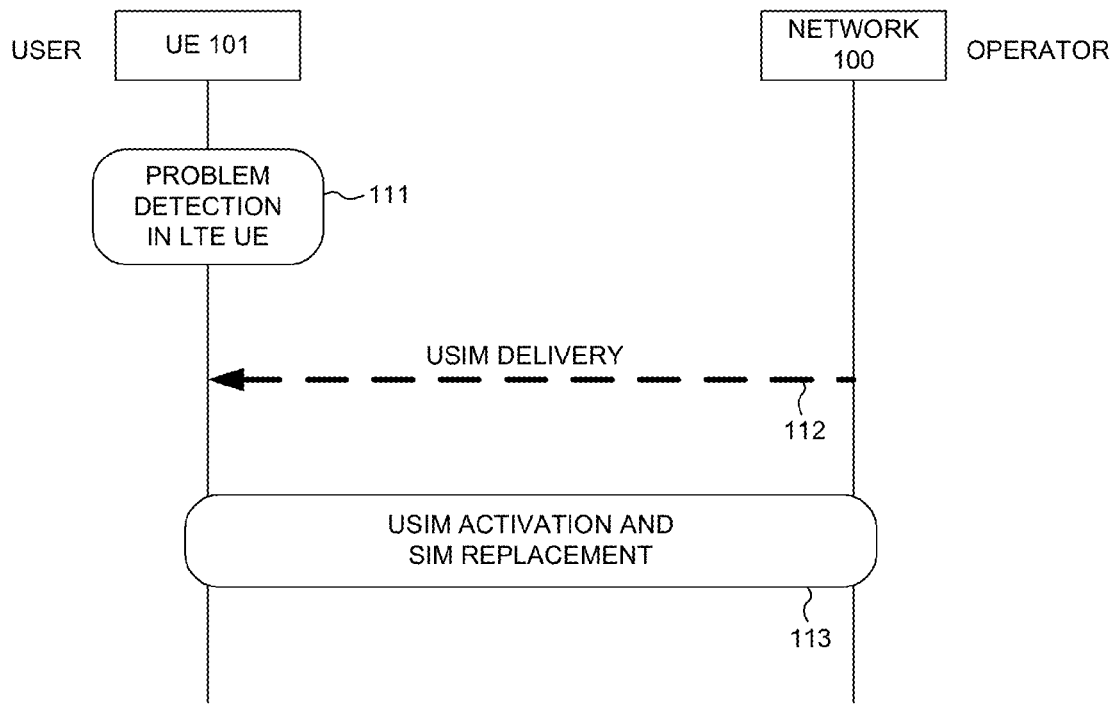
FIG. 1 illustrates a general procedure of SIM replacement for a user equipment (UE) in accordance with one novel aspect.

FIG. 1 illustrates a user equipment (UE) 101 in a mobile communication system 100 in accordance with one novel aspect. Mobile communication system 100 is a public land mobile network (PLMN) provided by an operator. Through the same PLMN, the operator provides a variety of cellular services including 2G and 3G/LTE access for establishing mobile communication. In the example of FIG. 1, UE 101 is a new LTE phone that is capable of attaching to an LTE network and using LTE services. However, accessing the LTE network requires identification and authentication via a subscriber identity module (SIM) card inserted in the UE. SIM cards are identified on their individual operator networks by a unique International Mobile Subscriber Identity (IMSI). The mobile network operators connect mobile phone calls and communicate with their SIM cards using their IMSIs.

A SIM card contains both hardware and software. The hardware part is later referred to as a Universal Integrated Circuit Card (UICC) physical smart card. The software part is referred to as the SIM application running on the SIM card. UMTS introduced a new application—the UMTS Subscriber Identity Module (USIM). The USIM software application brought security improvements like the mutual authentication and longer encryption keys and an improved address book. While 3G/LTE subscribers are allowed to access the 2G network, 2G subscribers cannot access the 3G/LTE network unless they replace SIM with USIM. In the example of FIG. 1, UE 101 is still equipped with a 2G SIM card running SIM application. As a result, the user is not able to use the LTE service even though UE 101 is a newly bought LTE phone.

In accordance with one novel aspect, a device-assisted enhanced SIM replacement procedure is provided. The SIM replacement procedure helps the operator to replace an old 2G SIM card running SIM application to a new 3G/LTE USIM card running USIM application. The SIM replacement procedure includes the following steps. In step 111, LTE UE 101 detects the problem of having an old 2G SIM card while the operator of the 2G SIM provides 3G/LTE service. Upon such problem detection, the user then notifies the operator. In step 112, the operator delivers a new USIM card to the user. In step 113, UE 101 and the operator together performs USIM activation and SIM replacement remotely. This solution is beneficial to operators because it complies with existing working model with a simplified procedure and helps operators to increase the LTE penetration rate.

Figure 2:
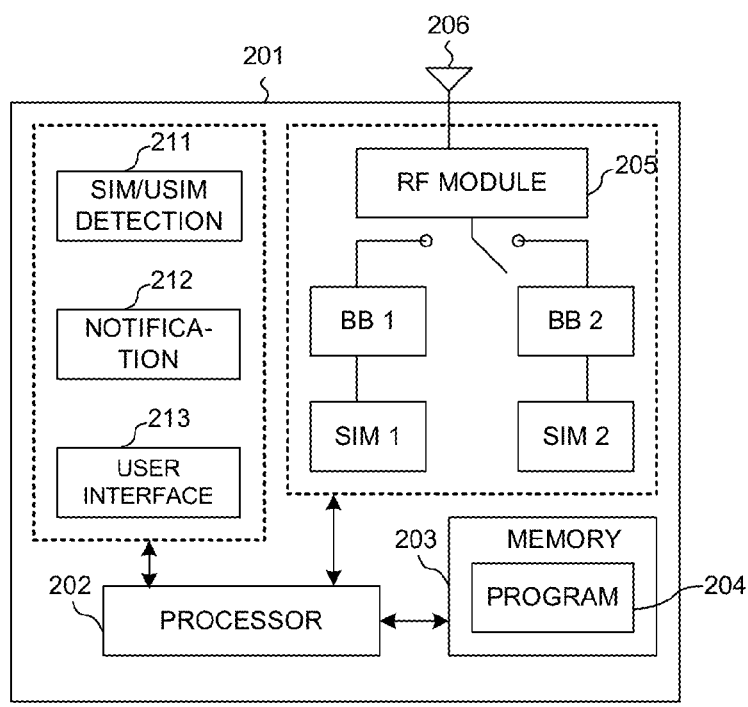
FIG. 2 is a simplified block diagram of a UE supporting enhanced SIM replacement in accordance with one novel aspect.

FIG. 2 is a simplified block diagram of a UE 201 carrying out certain embodiments of the present invention in accordance with one novel aspect. UE 201 comprises RF module 205, coupled with antenna 206, receives RF signals from antenna 206, converts them to baseband signals, and sends them to processor 202. RF module 205 also converts received baseband signals from processor 202, converts them to RF signals, and sends out to antenna 206. Processor 202 processes the received baseband signals and invokes different functional modules to perform features in the UE. Memory 203 stores program instructions and data 204 to control the operations of the UE.

Dual-SIM Dual-Standby (DSDS) is a very popular feature in smart phone markets today, especially in developing countries such as China and India. Many mobile phone users have multiple SIM cards for various purposes—having different phone numbers for different uses (e.g., one for business and one for personal), saving roaming fee, compensating non-contiguous network coverage, and sharing one device for multiple family members. With DSDS feature, mobile phone users can use single device to enjoy multiple SIM services. In the example of FIG. 2, UE 201 comprises two SIM cards, SIM1 and SIM2, to support DSDS feature, where SIM1 and SIM2 are coupled to their corresponding baseband modules BB1 and BB2 respectively, where BB1 and BB2 share the same RF module 205. The dual-SIM UE is used as a special example here to illustrate the enhanced SIM replacement procedure.

FIG. 2 further illustrates three functional modules 211 to 213 in the UE that carry out embodiments of the present invention. The functional modules may be implemented and configured by hardware, firmware, software, and any combination thereof. SIM/USIM detection module 211 detects the SIM card type and status of SIM1 and SIM2. Notification module 212 sends notifications and requests to the operator for SIM replacement. User Interface 213 provides various menu for the user to select SIM replacement options. For example, when UE 201 detects that it cannot attach to the LTE network because SIM1 is running 2G SIM application. UE 201 then sends out a notification to the operator for USIM application. Upon receiving and inserting a new USIM card in SIM2 slot, UE 201 detects the inactivated USIM card and notifies the operator for performing USIM activation and SIM replacement accordingly. The notification path is via the data path registered by the 2G SIM in SIM1 slot.

Figure 3:
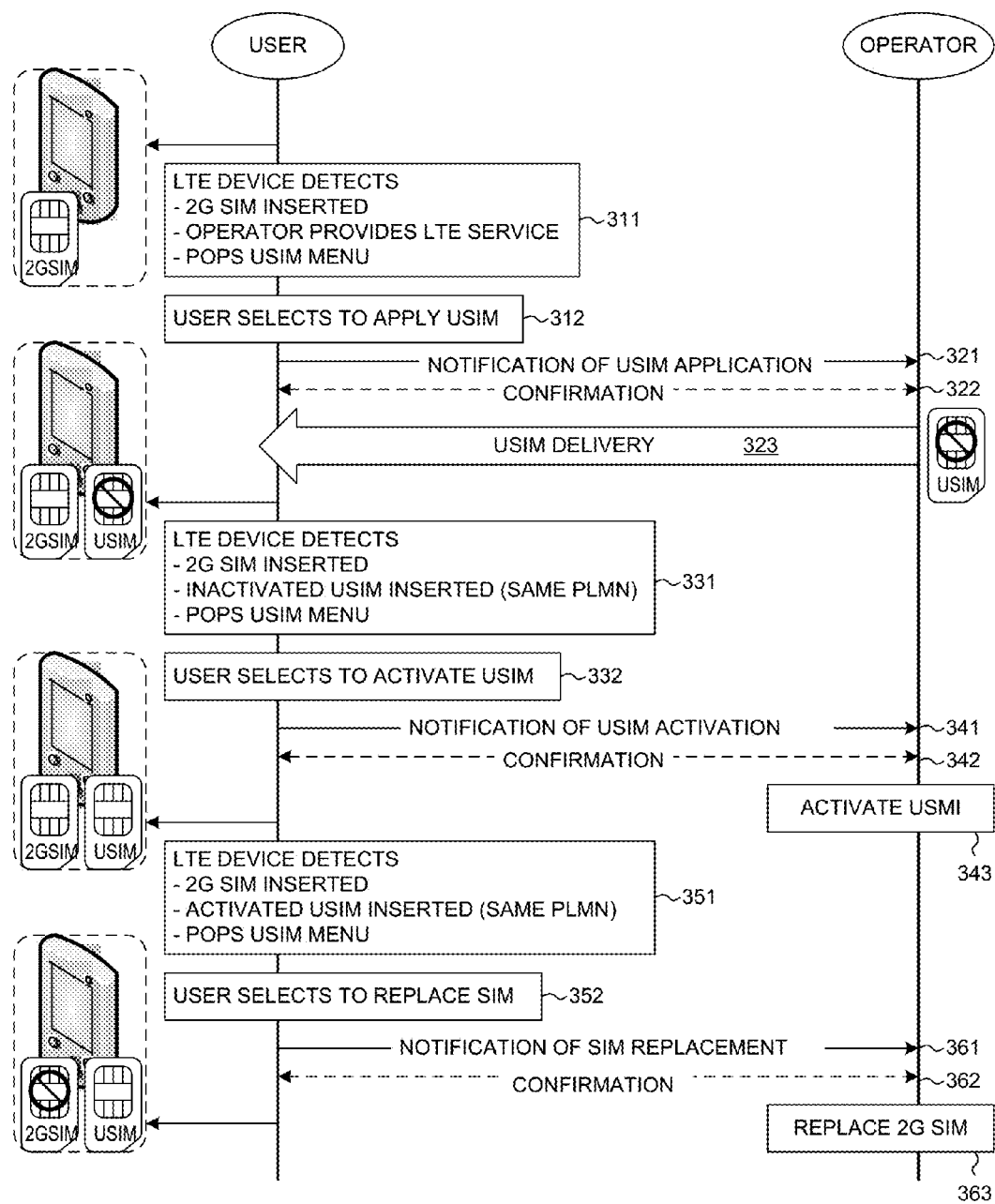
FIG. 3 illustrates one embodiment of a detailed signaling procedure of a device-assisted enhanced SIM replacement process.

FIG. 3 illustrates one embodiment of a detailed signaling procedure of a device-assisted enhanced SIM replacement process for an LTE device. For simplicity, the LTE UE in FIG. 3 is a dual-SIM UE supporting two SIM cards. However, the present invention is not limited to dual-SIM UEs, the dual-SIM UE may be replaced by a single UE, or two independent UEs. In step 311, the LTE UE detects that a SIM card is inserted in one of the SIM slots. The UE then checks the SIM card type and detects whether the SIM card is a 2G SIM card or a 3G/LTE USIM card. For example, the UE checks the service table in the SIM card, or checks the mandatory elementary file (EF). In the example of FIG. 3, the UE detects that a 2G SIM is inserted and the 2G SIM cannot be used to attach to the LTE network. In addition, the UE finds out the PLMN provided by the operator from the EF GSM/HPLMNwAct, as well as the services supported by the same PLMN. This can be done by NAS signaling, software configuration, or full band channel scanning to check if LTE band is available. In the example of FIG. 3, the UE detects that the same PLMN indeed supports LTE service.

After the detection in step 311, the UE then pops up a USIM selection menu on a display screen for a user to select the USIM application (step 312). If the user choose to apply USIM, then in step 321, the UE sends out a notification to a network server (e.g., provided by the operator or by a $3^{rd}$ party service provider) for USIM application. The notification can be sent via various ways including a short message (SMS), unstructured supplementary service data (USSD), a voice call, and IP traffic. In step 322, the operator may further confirm the USIM application with the user (e.g., by phone call). Upon the problem detection and notification, in step 323, a USIM card is delivered to the user and then inserted in the UE. In one example, the USIM card includes both hardware and software, e.g., a UICC physical smart card supporting USIM software application. In another example, the USIM card refers to only the USIM software application, which may be delivered by a data path.

In step 331, the UE detects that both a 2G SIM card and an inactivated USIM card are inserted. The UE records the ID (e.g., IMSI) of each inserted SIM card in a SIM_List. If the IMSI of the current SIM card is not in the SIM_List, then it is detected as a new SIM card. The UE also detects that the inserted new SIM card is a USIM card by checking the SIM type, and that the USIM card belongs to the same PLMN as the 2G SIM card by checking the elementary file USIM/HPLMNwAct. Furthermore, the UE detects whether the USIM card is activated or inactivated. For example, the UE may try to attach to the LTE network by using the USIM card. If the UE receives an error cause defined by the operator/standard, then the UE knows that the USIM card is inactivated. Alternatively, the user may simply try to make a voice call by using the USIM. If the voice call is unsuccessful, then the UE knows that the USIM card is inactivated.

After the UE detects an inactivated USIM card in one of the SIM slots, it will notify the user through the user interface, e.g., pops up a menu for the user to activate the USIM card (step 332). If the user choose to activate the USIM card, the UE then sends out a notification to the operator for USIM activation (step 341). For dual-SIM device, the notification can be sent through the data path registered by the 2G SIM card or USIM. In step 342, the operator may confirm the USIM activation with the user. Once confirmed, in step 343, the operator performs USIM activation. The USIM activation procedure in step 343 may include OAM in the operator network and/or USIM/2G SIM access through Over-the-Air (OTA) mechanism. The activation operation may need USIM/2G SIM access through OTA for data provisioning or withdraw, and for profile-installation. After USIM activation, the operator may notify the user after successful activation of the USIM card. If the activation fails, then the UE analyzes the error cause and inform the user in the user interface.

In step 351, the UE detects that both a 2G SIM card and an activated USIM card is inserted. The UE also detects that the 2G SIM and the USIM belong to the same PLMN provided by the operator. The UE then pops up a menu to prompt for user selection in step 352. If the user chooses to replace the 2G SIM card, the UE then sends out a notification to the operator for SIM replacement (step 361). In step 362, the operator may confirm the SIM replacement with the user. Once confirmed, in step 363, the operator performs SIM replacement. The SIM replacement procedure in step 363 may include OAM in the operator network and/or USIM/2G SIM access through Over-the-Air (OTA) mechanism. The replacement operation may need USIM/2G SIM access through OTA for data provisioning or withdraw, and for profile-deletion. The operator may notify the user after successful replacement of the SIM card performed in step 363. If the replacement fails, then the UE analyzes the error cause and inform the user in the user interface.

The notification path in steps 321, 341, and 361 may be sent via various ways including a short message (SMS), unstructured supplementary service data (USSD), a voice call, and IP traffic. For SMS option, the notification message contains an ID of the SIM/USIM card or the UE. For example, the ID may be the IMSI of the USIM, the IMSI of the 2G SIM, the IMEI of the UE with 2G SIM inserted, or the IMEI of the UE with USIM inserted. Note that a dual-SIM wireless device has two IMEIs for each SIM slot. In one example, the SMS is sent to a pre-defined operating center, and the MSISDN of the operating center may be specified in USIM/SIM, software, or other media independent from the UE. The SMS may be encrypted by the encryption algorithm in 2G SIM for security check. Upon receipt of the SMS from the UE, the operator may optionally confirm with the subscriber (e.g., by phone call, IVR), and notify the subscriber about the success of USIM activation/SIM replacement (e.g., by SMS). For voice call option, the UE automatically makes a mobile originated (MO) call to the operating center for USIM activation/SIM replacement. The MSISDN of the operating center may be specified in USIM/SIM, software, or other media independent from the UE. For USSD option, the UE automatically dials a specific USSD code (e.g., "*1234#"). The USSD code may be specified in USIM/SIM, software, or other media independent from the UE. The USSD code may include USIM IMSI derived information. Upon receipt of the USSD from the UE, the operator may optionally confirm with the subscriber (e.g., by phone call, IVR), and notify the subscriber about the success of USIM activation/SIM replacement (e.g., by SMS). For IP connection option, the UE automatically connects to the operating center (e.g., via its web page) for USIM activation/SIM replacement.

While the USIM activation and the SIM replacement illustrated in FIG. 3 are two independent procedures, they can be combined together for simplicity. Especially, if the user prefer to keep the same cellphone number after SIM replacement, then the USIM activation and the SIM replacement shall be performed together. Otherwise, the user will have two different cellphone numbers for the 2G SIM and the USIM.

Figure 4:
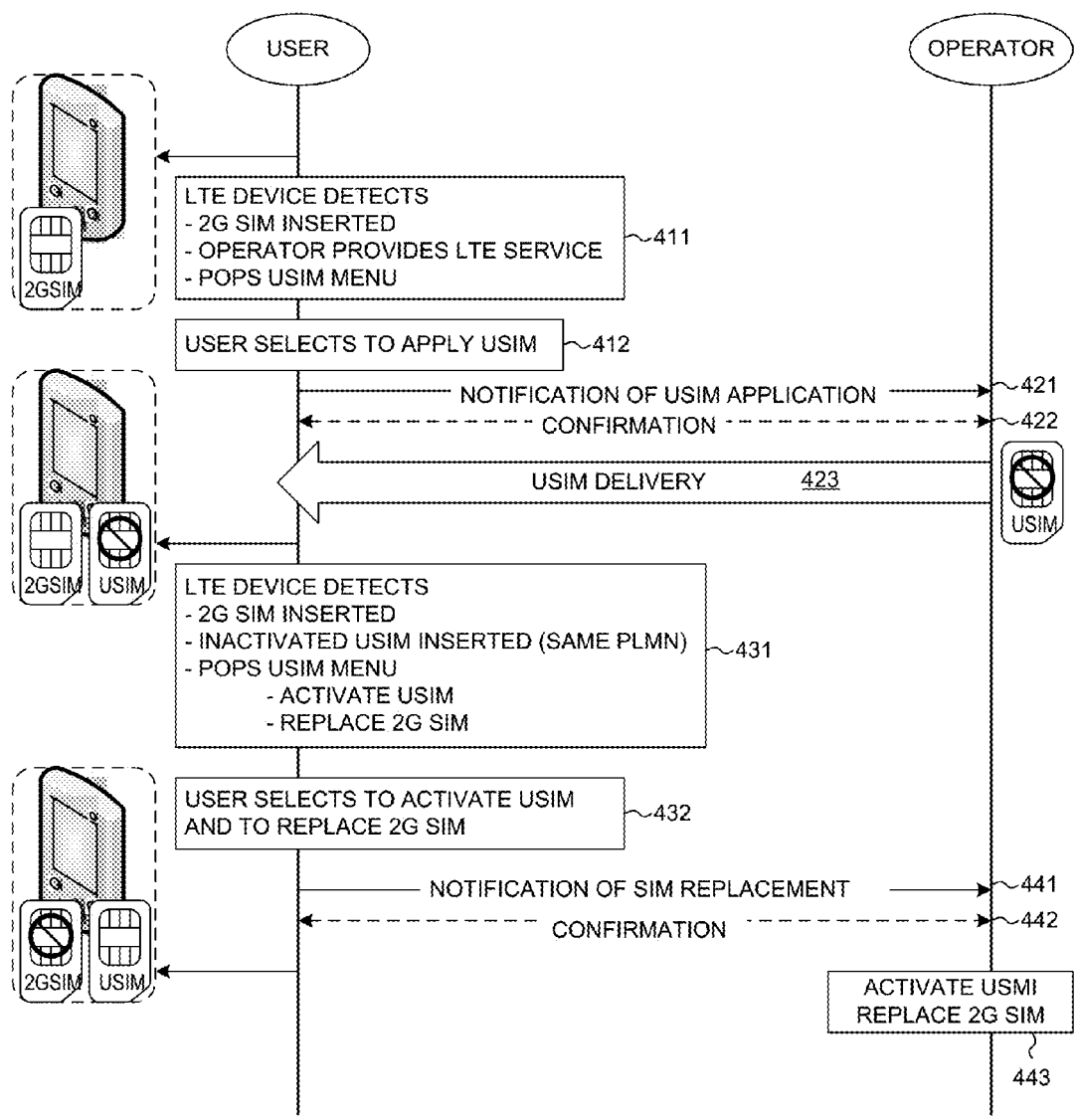
FIG. 4 illustrates another embodiment of a detailed signaling procedure of a device-assisted enhanced SIM replacement process.

FIG. 4 illustrates another embodiment of a detailed signaling procedure of a device-assisted enhanced SIM replacement process. Steps 411 through 423 in FIG. 4 are similar to steps 311 through 323 in FIG. 3. In step 411, an LTE device (UE) detects that a 2G SIM card is inserted and that the 2G SIM card cannot attach to the LTE network provided by the PLMN it belongs. As a result, in step 412, the UE pops a USIM selection menu for the user to apply USIM. In step 421, the UE sends a notification to the operator for USIM application. In step 422, the operator confirms with the UE for USIM application. In step 423, a new USIM card is delivered to the user and is inserted in the UE.

Steps 431 through steps 443 in FIG. 4 illustrate the combined USIM activation and SIM replacement, which are illustrated by steps 331 through 363 in FIG. 3. In step 431, the UE detects that both a 2G SIM card and an inactivated USIM card are inserted, and both SIM cards belong to the same PLMN provided by the operator. The UE then provides a prompt via the user interface, e.g., pop up a USIM menu for the user to activate the USIM card as well as to replace the 2G SIM card. In step 432, the user selects to activate USIM and to replace 2G SIM. In step 441, the UE sends out a notification to the operator for USIM activation and SIM replacement. In step 442, the operator may confirm the activation and the replacement with the user. Finally, in step 443, the operator performs USIM activation and SIM replacement.

Figure 5:
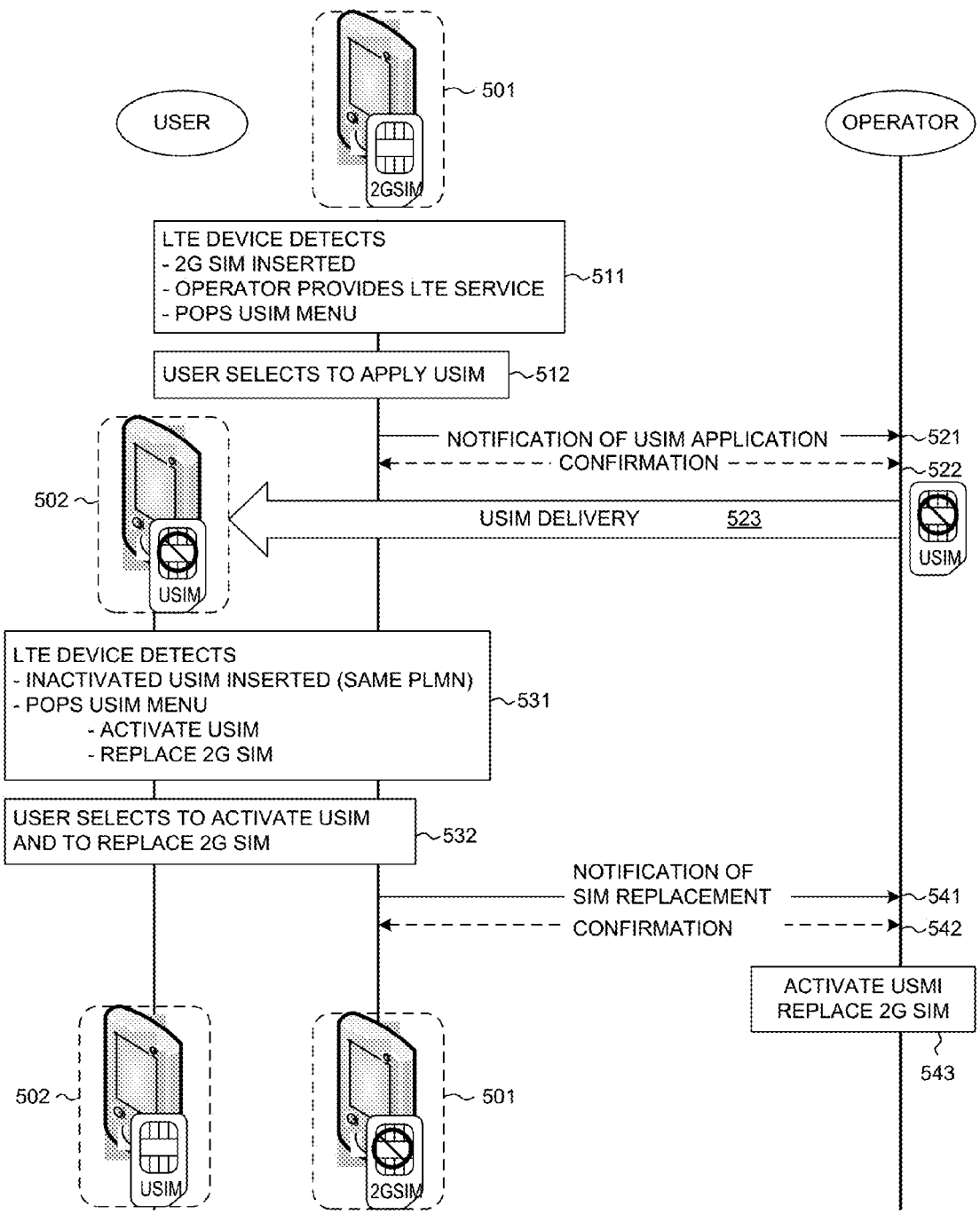
FIG. 5 illustrates an example of an enhanced SIM replacement procedure using a single UE or two independent UEs instead of a dual-SIM UE.

FIG. 5 illustrates an example of an enhanced SIM replacement procedure using a single UE or two independent UEs instead of a dual-SIM UE. Although a dual-SIM UE is preferred for the above-illustrated SIM replacement procedure, the same solution can be achieved using a single LTE device or two independent devices. Steps 511 through 523 in FIG. 5 are similar to steps 411 through 423 in FIG. 4. In step 511, an LTE device (UE 501) detects that a 2G SIM card is inserted and that the 2G SIM card cannot attach to the LTE network provided by the PLMN it belongs. As a result, in step 512, the UE pops a USIM selection menu for the user to apply USIM. In step 521, the UE sends a notification to the operator for USIM application. In step 522, the operator confirms with the UE for USIM application. In step 523, a new USIM card is delivered to the user. Because UE 501 does not have two SIM slots, the user may insert the USIM card in another UE 502 as depicted in FIG. 5. Alternatively, the user may swap the USIM card with the original 2G SIM card in the same UE 501.

In step 531, UE 502 detects that an inactivated USIM card is inserted, and the USIM card belongs to the same PLMN provided by the operator. UE 502 then provides a prompt via the user interface, e.g., pop up a USIM menu for the user to activate the USIM card as well as to replace the 2G SIM card. In step 532, the user selects to activate USIM and to replace 2G SIM. In step 541, UE 501 or UE 502 sends out a notification to the operator for USIM activation and SIM replacement. In step 542, the operator may confirm the activation and the replacement with the user. Finally, in step 543, the operator performs USIM activation and SIM replacement. The USIM activation and SIM replacement procedure in step 543 may include OAM in the operator network and/or USIM/2G SIM access through Over-the-Air (OTA) mechanism. The USIM activation and SIM replacement operation may need USIM/2G SIM access through OTA for data provisioning or withdraw. The operator may notify the user after successful replacement of the SIM card performed in step 543. If the replacement fails, then the UE analyzes the error cause and inform the user in the user interface.

Figure 6:
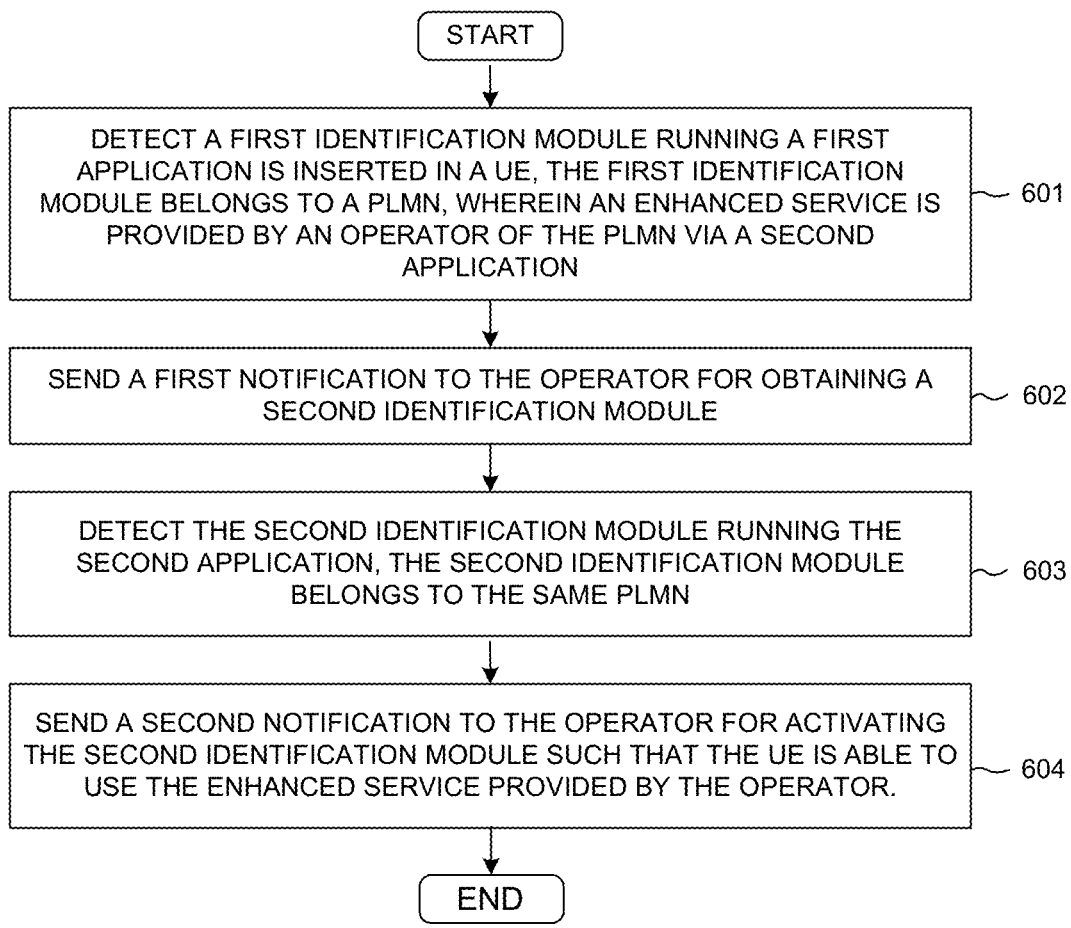
FIG. 6 is a flow chart of a method of supporting enhanced SIM replacement procedure in accordance with one novel aspect.

FIG. 6 is a flow chart of a method of supporting enhanced SIM replacement procedure in accordance with one novel aspect. In step 601, a UE detects that a first identification module running a first application is inserted in the UE. The first identification module belongs to a PLMN, and an enhanced service is provided by an operator of the PLMN via a second application. In step 602, the UE sends a notification to the operator for obtaining a second identification module. In step 603, the UE detects that the second identification module running the second application is inserted in the UE. The second identification module belongs to the same PLMN. In step 604, the UE sends a second notification to the operator for activating the second identification module such that the UE is able to use the enhanced service provided by the operator in the same PLMN.

While the above-illustrated example is for 2G SIM card and USIM card, the SIM replacement procedure applies to any other types of identification modules including remote SIM, virtual SIM, smart SIM, and embedded SIM/embedded Universal Integrated Circuit Card (eUICC) (e.g., for M2M communications) etc. The device assisted solution for SIM replacement complies with existing security/authentication model, has no standard charge, and complies with existing SIM replacement model and offers a simpler and more automatic procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) detecting a first identification module running a first application is inserted in a user equipment (UE) by the UE, wherein the first identification module belongs to a Public Land Mobile Network (PLMN);
   (b) detecting that the UE is unable to access an enhanced service network provided by an operator of the PLMN via the first application; and
   (c) sending a first notification to a network server for obtaining a second application such that the UE can access the enhanced service network of the same PLMN.

2. The method of claim 1, wherein the first application is a Subscriber Identity Module (SIM) application.

3. The method of claim 1, wherein the second application is one of a Universal Subscriber Identity Module (USIM), a remote SIM, a virtual SIM, a smart SIM, an embedded SIM, and profile data for embedded Universal Integrated Circuit Card (eUICC).

4. The method of claim 1, further comprising:
   (d) detecting a second identification module running the second application; and
   (e) sending a second notification to the network server for activating the second identification module such that the UE is able to use the enhanced service provided by the operator.

5. The method of claim 4, wherein the notifications are sent through one of a short messaging (SMS), unstructured supplementary service data (USSD), a voice call, and IP traffic.

6. The method of claim 4, wherein the sending in (c) and (e) is triggered by prompting a selection menu on a user interface of the UE.

7. The method of claim 4, wherein the UE is inserted with both the first and the second identification modules belong to the same PLMN, and wherein the second notification is sent via the first or the second identification module.

8. The method of claim 4, wherein the activating in (e) involves an Operation Administration and Management (OAM) mechanism in the operator network.

9. The method of claim 4, wherein the activating in (e) involves accessing the second identification module via an Over-the-Air (OTA) mechanism.

10. A method, comprising:
    (a) detecting an identification module running an application is inserted in a user equipment (UE), wherein the application is one of a Universal Subscriber Identity Module (USIM), a remote SIM, a virtual SIM, a smart SIM, an embedded SIM, and profile data for embedded Universal Integrated Circuit Card (eUICC);
    (b) sending a notification to a network server for activating the identification module; and
    (c) performing an activation procedure for activating the identification module such that the UE can access an enhanced service network, wherein the activating involves an Operation Administration and Management (OAM) mechanism in an operator network or accessing the second identification module via an Over-the-Air (OTA) mechanism.

11. The method of claim 10, wherein the UE detects whether the identification module is activated by attaching to the enhanced service network via NAS signaling or making a voice call via the enhanced service network.

12. The method of claim 10, wherein the notification further comprises a request for replacing a previously inserted identification module.

13. The method of claim 10, wherein the UE sends a second notification to an operator for replacing a previously inserted identification module.

14. A user equipment (UE), comprising:
    a first identification module running a first application that is inserted in the UE, wherein the first identification module belongs to a Public Land Mobile Network (PLMN), and wherein an enhanced service is provided by an operator of the PLMN via a second application;

a second identification module running the second application is inserted in the UE, wherein the second identification module is activated via an Operation Administration and Management (OAM) mechanism in the operator network or via accessing through an Over-the-Air (OTA) mechanism; and a notification module that sends a first notification to the operator for obtaining the second identification module, wherein the notification module also sends a second notification to the operator for activating the second identification module such that the UE is able to use the enhanced service provided by the operator.

15. The UE of claim 14, wherein the first application is a Subscriber Identity Module (SIM) application.

16. The UE of claim 14, wherein the second application is one of a Universal Subscriber Identity Module (USIM), a remote SIM, a virtual SIM, a smart SIM, an embedded SIM, and profile data for embedded Universal Integrated Circuit Card (eUICC).

17. The UE of claim 14, wherein the notifications are sent through one of a short messaging (SMS), unstructured supplementary service data (USSD), a voice call, and IP traffic.

18. The UE of claim 14, wherein the UE detects whether the second identification module is activated by making a voice call using the enhanced service.

19. The UE of claim 14, wherein the second notification further comprises a request for replacing the first identification module.

20. The UE of claim 14, wherein the UE sends a third notification to the operator for replacing the first identification module.

* * * * *